United States Patent [19]
Hesse

[11] 3,759,623
[45] Sept. 18, 1973

[54] STAND

[76] Inventor: Kurt Hesse, 38 Waterfohr, Lemgo-Lippe, Germany

[22] Filed: Mar. 10, 1971

[21] Appl. No.: 123,101

[30] Foreign Application Priority Data
Mar. 11, 1970 Germany .................. G 70 08 903.1

[52] U.S. Cl. .................... 403/298, 403/375, 248/159
[51] Int. Cl. .............................................. F16b 7/00
[58] Field of Search ............ 248/159; 287/2, 127 R, 287/127 E; 285/370, 397, 398

[56] References Cited
UNITED STATES PATENTS
| 1,484,355 | 2/1224 | Moir et al. ........................ 285/370 X |
| 2,679,911 | 6/1954 | Bhend .................................. 287/2 X |
| 3,099,470 | 7/1963 | Zumbusch ........................ 287/127 R |
| 3,176,987 | 4/1965 | Johnston ............................ 287/2 X |

FOREIGN PATENTS OR APPLICATIONS
| 832,566 | 4/1960 | Great Britain ...................... 285/397 |
| 974,115 | 11/1964 | Great Britain ...................... 285/397 |

Primary Examiner—William M. Schultz
Attorney—Sughrue, Rothwell, Mion, Zinn & Macpeak

[57] ABSTRACT

A stand comprising several sections connected together, the sections being tubular at least at their ends, a connecting bolt engaging with a clamping action in the ends of adjacent sections, said bolt having at least one naturally resilient clamping member located therearound, which enlarges the cross-section of said bolt, the clamping member being adapted to press against the inner wall of a section, and having several outwardly projecting clamping surfaces.

6 Claims, 4 Drawing Figures

PATENTED SEP 18 1973 3,759,623
Fig.1 Fig.2 Fig.3
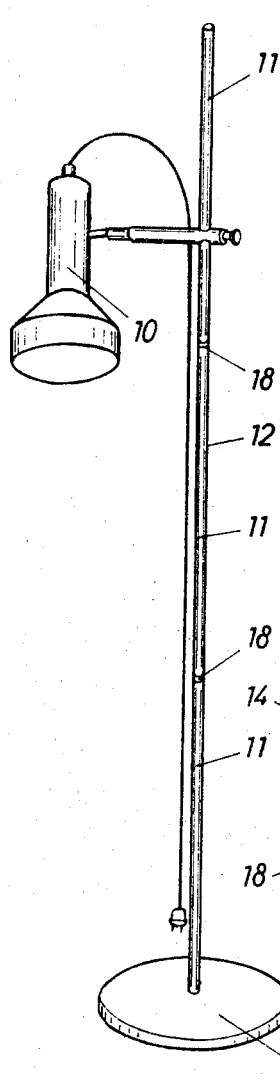
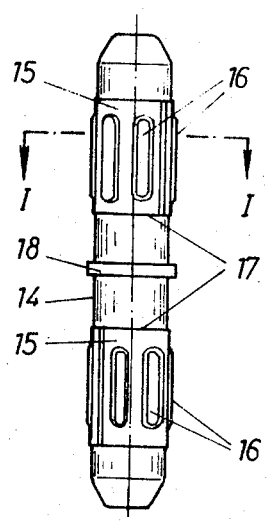
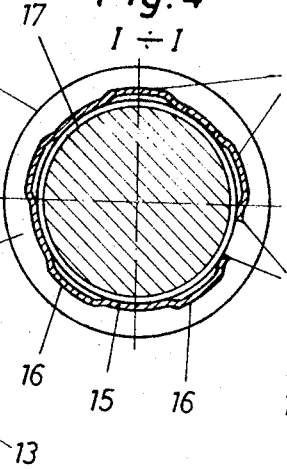
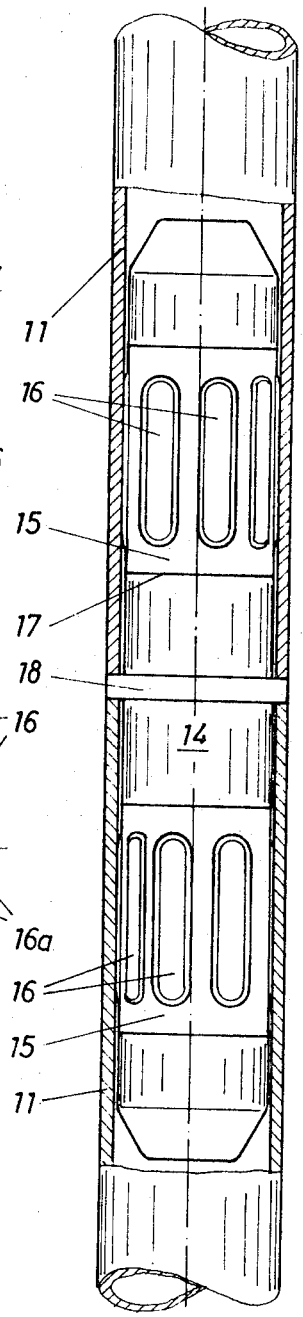
INVENTOR:
Kurt Hesse
by

STAND

The present invention relates to a stand, more particularly to a stand comprised of several sections detachably connected together.

It is known to connect individual lengths or tube sections together to form a stand by screwing them together or inserting them one within the other. In the case of inserted connection between adjacent lengths, one length engages in the other length by an end of reduced cross-section.

The known methods of connecting lengths to form a stand are frequently unstable and do not provide the lengths with a rigid longitudinal extension.

It is the principal object of the present invention to provide an improved stand formed in a simple manner from sections reliably and detachably connected together.

A further object of the present invention is to make the sections of the stand stable in the area in which they are connected together.

A still further object of the present invention is to make connection of adjacent sections simple and economical as well as durable.

According therefore to the present invention there is provided a stand comprising several sections connected together, the sections being tubular at least at their ends, a connecting bolt engaging with a clamping action in the ends of adjacent sections, said bolt having at least one naturally resilient clamping member located therearound which engages the cross-section of said bolt, the clamping member being adapted to press against the inner wall of a section and having several outwardly projecting clamping surfaces.

Each connecting bolt preferably has, one either side of a collar limiting the depth of insertion into a section, a clamping member in the form of a sleeve with a longitudinal gap extending along the entire length of the clamping member. Several outwardly projecting beads are provided on the clamping member and form clamping surfaces.

Each clamping member is displaceably located in an annular groove formed in the connecting bolt. The clamping member engages around the bolt with play which is eliminated by the clamping action of the member upon the connection of the stand sections.

Adjacent sections of the stand are detachably connected by the clamping action of the clamping member when the connecting bolt is inserted into the sections. The beads press against the inner wall of the section and effect a reliable and stable connection in a simple manner, requiring very little force and only resilient pressure.

Furthermore, the bolt engages in the sections so that they are stably secured relative to each other and have a rigid longitudinal extension.

The connection bolt is simple and economical to manufacture and manipulations for establishing the connection of sections are very simple. The bolt is simply pressed into the two ends of adjacent sections. The connection so formed is unobtrusive.

A preferred embodiment of the invention will hereinafter be described with reference to the accompanying drawings, in which:

FIG. 1 shows a perspective view of a lamp stand which is formed of several sections detachably connected together, FIG. 2 shows a side view of a bolt, used to detachably connect adjacent sections of a stand together, FIG. 3 shows a side view in partial longitudinal section of two sections of a stand assembled by means of the connecting bolt of FIG. 2, FIG. 4 shows a cross-section through the connecting bolt taken on the lines I — I of FIG. 2, shown on a magnified scale.

A stand according to the present invention, more particularly for supporting lamps 10, comprises a support 12 formed of several detachably inter connected sections 11, such as tubes or rods, which have sleeves at the ends. The support 12 is connected at its lower end to a base 13, for example, a plate or frame. One or more lamps 10 are held on the support 12 and may be displaceable in the longitudinal direction of the support 12.

Two adjacent sections 11 of the support 12 are detachably connected together by a connecting bolt 14 which engages by means of a clamping action in the ends of the sections if they are tubular or in sleeves formed at the ends of the sections if they are rods.

The connecting bolt 14 has a circular cross-section and in its longitudinal direction is provided with at least one, preferably two, partially yielding clamping members 15 which are arranged in spaced relationship. The members 15 enlarge the cross-section of the bolt, and, when two sections 11 are connected together they are in contact with the inner wall of the tubular section 11 or in contact with the inner wall of the sleeve on the end of a rod-like section 11. The members 15 make contact with the inner walls under the compression so that a clamping connection is formed between connecting bolt 14 and the two sections 11.

Each clamping member 15 is formed as a sleeve which has several clamping surfaces projecting outwardly from the enlarged cross-section of the bolt and are preferably formed of beads 16.

The beads 16 are uniformly distributed over the circumference of the clamping member 15 which has a longitudinal gap extending along its entire length. The beads 16 extend over a substantial part of the entire length of the clamping member 15 which is preferably made of spring steel.

It is preferable to form each clamping member 15 from a strip of sheet metal bent into a circular ring and provided with beads 16. The longitudinal edges 16a of two of the beads 16 are secured spaced from each other to form the longitudinal gap in the clamping member 15.

Each clamping member 15 is rotatably located in an annular groove 17 in the bolt 14 and engages with play around the connecting bolt 14. When the bolt 14 is inserted in an end of a tube or in a sleeve on the end of a rod, the clamping member 15 is compressed so that its diameter is reduced. This reduction in diameter is possible because of the gap in the member 15. The entire thickness of the member 15 is pressed into the annular groove 17 of the bolt 14 and only the projecting heads 16 project as clamping surfaces beyond the cross-section of the bolt 14. These beads 16 press against the inner wall of the section 11 and represent the clamping connection between the bolt 14 and the section 11.

A collar 18 extending at least partially around the bolt 14, but preferably extending completely around the bolt 14, is provided on the connecting bolt 14 in substantially the centre longitudinal portion thereof, and forms a stop for limiting the depth of insertion of said bolt 14 into the section 11.

A clamping member 15 is arranged on the bolt 14 between the collar 18 and the end thereof on both sides of the collar 18, the member 15 occupying a portion of the length of the bolt between the collar 18 and the end thereof. Thus, only one clamping member 15 is necessary to connect two sections 11 together. The cross-section of the collar 18 corresponds to the cross-section of the sections 11 to be connected so that in the connected condition one section 11 merges smoothly into the other. Preferably, the connecting bolt 14 is not externally visible to an appreciable extent. The transitions between the sections 11 are not absolutely smooth.

It is preferable if both ends of the bolt 14 are tapered, chamfered and/or rounded, so that insertion of the bolt 14 into the sections 11 is as easy as possible. The bolt 14 can be made of metal or synthetic material.

I claim:

1. A connector for axially joining together two tubular sections, comprising:
   a. a solid cylindrical member adapted to be inserted into the axially aligned ends of the two tubular sections,
   b. a collar rigidly mounted on the central longitudinal portion of the cylindrical member and completely surrounding the member, said collar extending radially outward from the cylindrical member a uniform distance to limit the depth of insertion of the member into the tubular sections,
   c. a pair of resilient compression sleeves positioned on and generally surrounding the cylindrical member, each compression sleeve located between the collar and one end of the member,
   d. each sleeve comprising a rectangular strip of sheet metal bent into the cross-sectional shape of an open circle having a longitudinal slot extending over the length of the sleeve in an axial direction, said slot serving to accommodate the inward compression of the sleeve as the cylindrical member is inserted into the end of a tubular section, and
   e. a plurality of outwardly projecting frictional engagement surfaces uniformly distributed over the circumference of each sleeve, each surface being longitudinally oriented and extending over a substantial portion of the length of the sleeve.

2. A connector as recited in claim 5, wherein said tubular sections form a stand, said stand comprising a plurality of tubular sections having adjacent ends between each of two set tubes joined together by one of said connectors inserted therebetween.

3. A connector as recited in claim 5, wherein said collar has the same cross-section as that of the tubular sections, and wherein the two ends of said cylindrical member are chamfered and tapered.

4. A connector as recited in claim 1 further comprising an annular groove in each half of the cylindrical member having a width at least equal to the axial height of a sleeve, whereby a sleeve may be accommodated within a corresponding annular groove upon inward compression.

5. A connector as recited in claim 1 wherein the frictional engagement surfaces have a generally oval outline.

6. A connector as recited in claim 4, wherein the frictional engagement surfaces have a generally oval outline.

* * * * *